United States Patent [19]

Kroll

[11] Patent Number: 6,062,474
[45] Date of Patent: May 16, 2000

[54] ATM SIGNATURE SECURITY SYSTEM

[76] Inventor: Mark William Kroll, 493 Sinaloa Rd., Simi Valley, Calif. 93065

[21] Appl. No.: 08/942,820

[22] Filed: Oct. 2, 1997

[51] Int. Cl.$^7$ .................................................. G06K 5/00
[52] U.S. Cl. ............................ 235/382; 235/379; 902/3; 902/5
[58] Field of Search .................... 235/379, 380, 235/382, 382.5; 902/1, 2, 3, 5; 382/115

[56] References Cited

U.S. PATENT DOCUMENTS

| | | |
|---|---|---|
| 3,896,266 | 7/1975 | Waterbury ................................ 235/380 |
| 4,592,086 | 5/1986 | Watari et al. ............................. 381/43 |
| 4,621,334 | 11/1986 | Garcia ...................................... 902/3 X |
| 4,736,445 | 4/1988 | Gundersen ................................ 382/3 |
| 4,805,222 | 2/1989 | Young . |
| 5,193,114 | 3/1993 | Moseley . |
| 5,386,104 | 1/1995 | Sime . |
| 5,557,686 | 9/1996 | Brown . |
| 5,594,806 | 1/1997 | Colbert et al. ........................... 382/115 |
| 5,721,765 | 2/1998 | Smith . |
| 5,764,789 | 6/1998 | Pare, Jr. et al. ........................ 382/115 |
| 5,868,669 | 2/1999 | Iliff ........................................ 600/300 |

*Primary Examiner*—Karl D. Frech

[57] ABSTRACT

A method is taught for analyzing the keystroke timing signature of an ATM or other electronic commerce customer. The timing signature is compared to a database of previously stored keystroke timing sequences to allow for a test of the identity of the putative customer. This allows increased identification without the need for additional hardware beyond the ubiquitous keypad or keyboard.

14 Claims, 3 Drawing Sheets

ATM SIGNATURE SECURITY SYSTEM

BACKGROUND OF THE INVENTION

Automatic Teller Machines (ATMs) are a wonderful convenience for bank customers. Unfortunately they are also a significant convenience for street criminals. Many street criminals stake out ATM locations. They will then wait until the cash machine is visited by a single vulnerable customer. They will then confront the customer with a weapon or threat and demand that the customer withdraw the maximum amount of cash available.

In many other instances, home invasion burglars and rapists have taken cash cards and used intimidation and violence to extract the PIN number from the customer.

Through other means, often not violent, criminals will come across someone's PIN number and a cash or credit card. This is many times done simply because the customer had the PIN number written in an insufficiently covert means in a wallet or a purse.

What is needed is a means to go beyond the PIN number to ensure that only the appropriate individual is in fact using the ATM. The only suggestion in the art that the inventor is aware of is the invention of Colbert (U.S. Pat. No. 5,594,806) which teaches a computer camera analysis of the knuckles of the customer as a type of simplified fingerprint scheme. This would still not protect the customer who is being forced to make a cash withdrawal under duress. What is needed is a system that would refuse to cooperate with a cash withdrawal when the appropriate customer is under extreme duress and/or the ATM operator is in fact not the appropriate customer.

DETAILED DESCRIPTION OF THE DRAWINGS AND SUMMARY OF THE INVENTION

Figure 1:
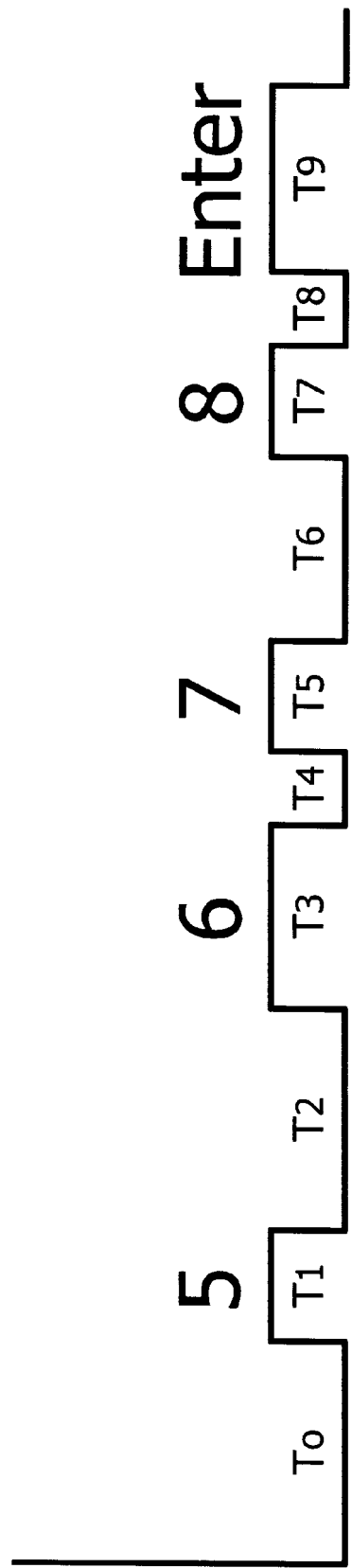
FIG. 1 shows a keyboard signature of a customer entering a PIN number.

FIG. 1 shows the keyboard signature that is generated when a customer enters a PIN number. In this example the PIN number is 5678. There are a total of 10 unique times associated with this entry. There is the first time which is $T_0$ which is the time after the "enter PIN" command is given by the ATM until the customer enters the first digit of the PIN.

The next time which is $T_1$ is the time that the button is held down to enter the "5" for the first digit of the PIN.

These times are then generated throughout the entry of the PIN number ending with time $T_8$ (the space between the release of the last PIN digit and the depression of the "Enter" or "OK" key) and finally, the duration of the keypress of the "Enter" key is $T_9$ which signifies the completion of the PIN code.

Many other numbers can be used to generate a keyboard signature on a ATM. For example the delay from the command "Enter Type of Transaction" to the actual depression of the appropriate key and the duration of the depression of that key is another component to an ATM's signature. The delay from the commands "Select Account" to the actual account selection and the duration of the time of the depression of the account selection button is another signature.

A signature can be built around the numeric entry of the desired amount of cash although this presents complications in that the amount of cash may vary between transactions and thus is not used in the preferred embodiment.

Figure 2:
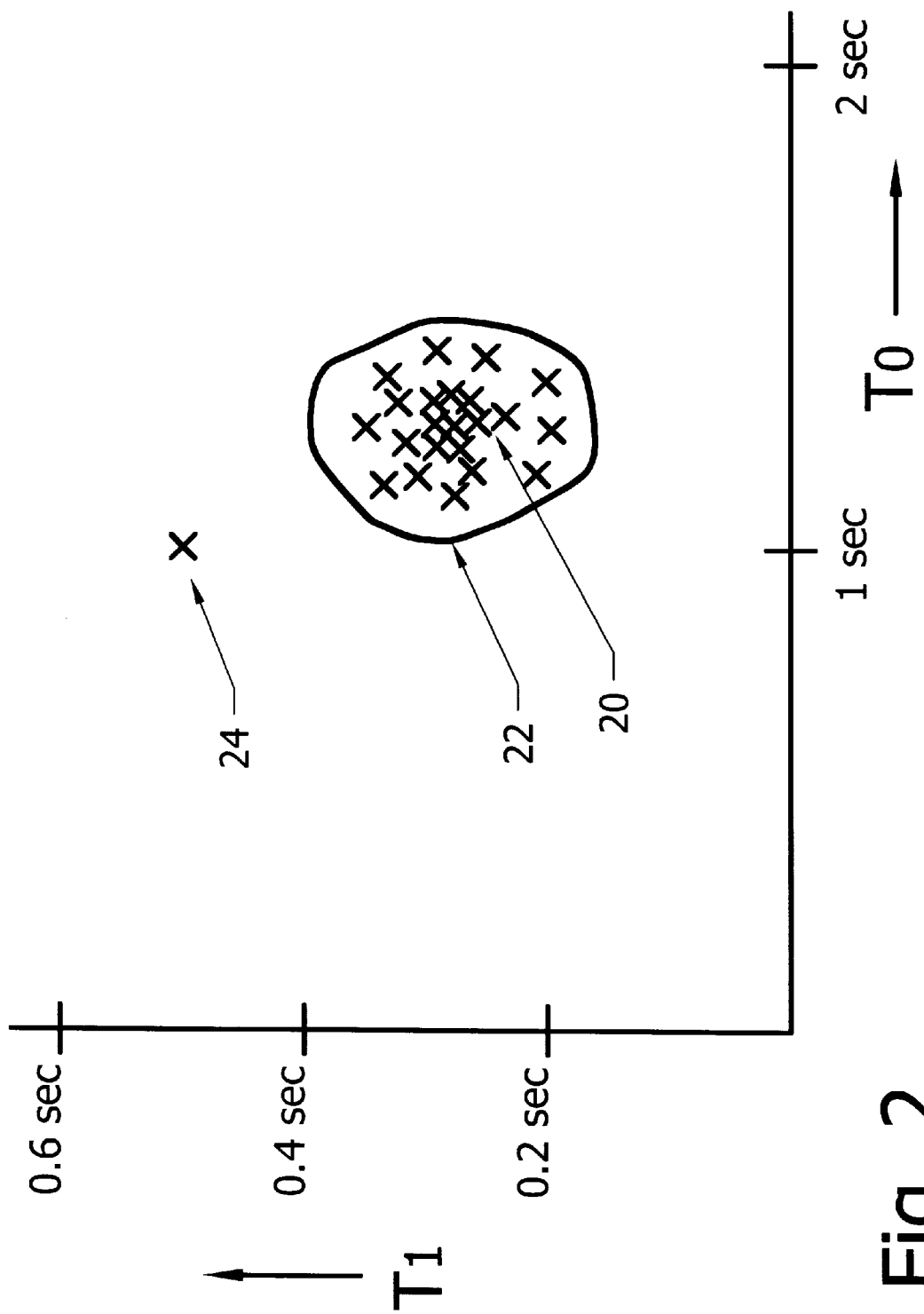
FIG. 2 shows a Cartesian map of a 2 item signature.

Proceeding with the preferred embodiment of transmitting a 10 unit vector of times for the keyboard signature, we will consider a simplified version of the analysis of the signature as shown in FIG. 2. For simplicity we will simply analyze a two component signature. This also aids in visualization as this can be done on a two dimensional drawing. In this case the two component signature comprises the times $T_0$ and $T_1$ from FIG. 1. The points in the set 20 shows that this operator typically has a $T_0$ time of 1 to 1.3 seconds (recall that this represents a delay from the Enter PIN command to the entry of the first PIN digit).

Similarly this set shows that this operator typically holds down the switch for the first digit of the PIN for about 0.2 to 0.4 seconds. Note that the dispersion in $T_0$ is greater than the dispersion in $T_1$. This is not a problem with the robust statistical techniques that can be used to classify such signatures.

A number of techniques can be used to construct an acceptance set. In this case the boundary shown as curve 22 represent the limit of acceptance for this customers "signature." An entry 24 which signifies a $T_0$ time of 1 second and a $T_1$ time of 0.5 seconds is shown as the X. This entry is out of the acceptance region and thus would be rejected.

The extensions of this approach to ten dimensional space for using the vector shown in FIG. 1 are easily accomplished by anyone skilled in the art of statistics, signal processing, or detection theory. The construction of the boundary 22 can be done a number of ways. One way is to simply take each individual time and construct a mean and standard deviation for that time. The limits then for that time are the mean plus or minus three standard deviations for that individual time component. This gives an acceptance region which is a higher dimensional analog of a rectangle. Other techniques can give arbitrary shapes including ellipsoids and tiled surfaces.

The statistical analysis method could also use a neural net in which all of the time numbers were fed in and a decision was made on the basis of the neural net response.

Figure 3:
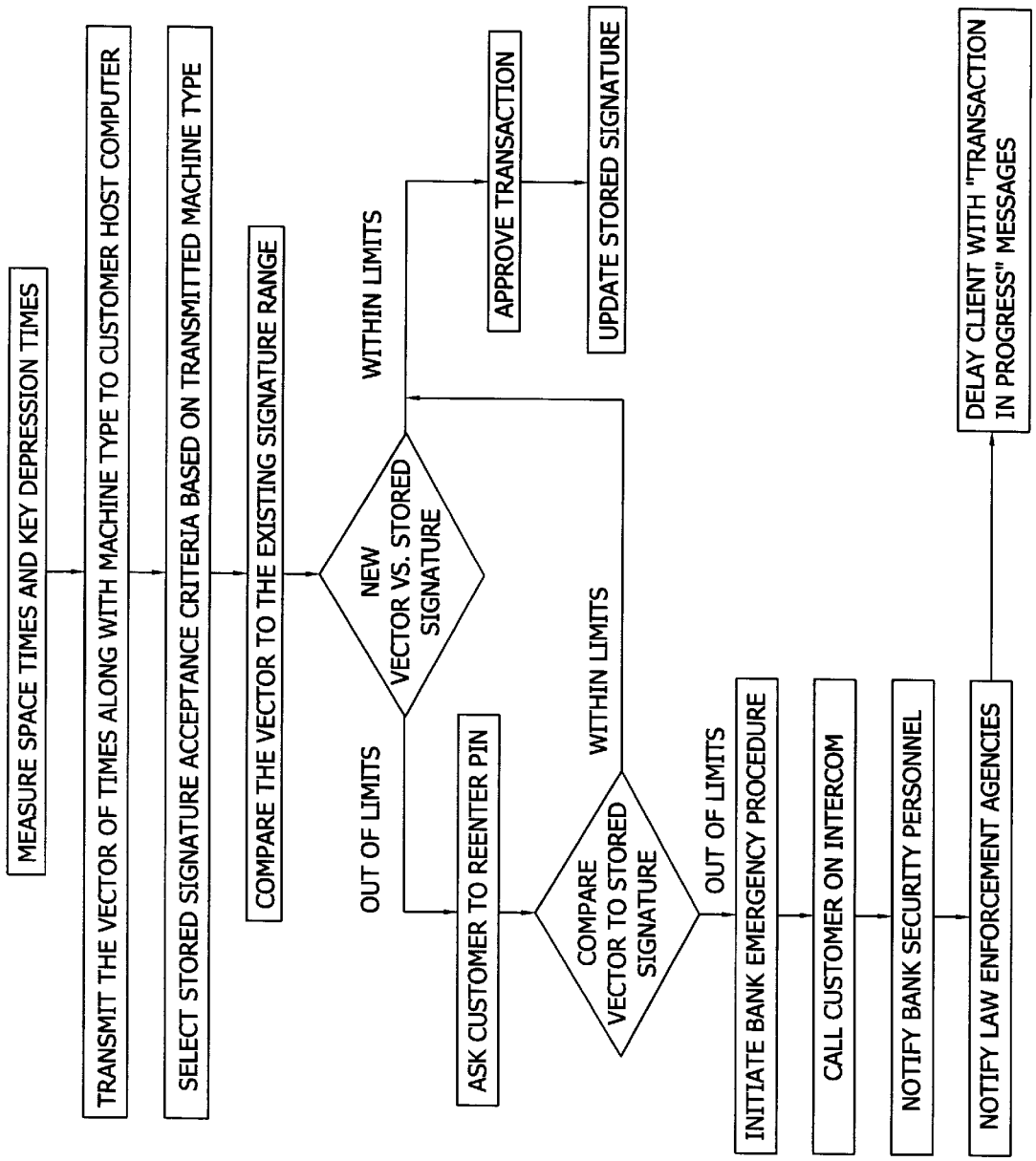
FIG. 3 shows a flow chart of the basic method of the invention.

FIG. 3 shows the flow chart of the basic method of this invention. The method first measures the space times and key depression times as shown in FIG. 1. The method then transmits the vector of these times along with the machine type to the customer's host computer. This refers to the bank or credit card agency that issued the card. The machine type is also required to be transmitted as different types of machines and keyboards will change the client's signature. A new type of machine which the customer is not familiar with will also delay keystrokes and thus one could not make a valid comparison between the signature for one type of machine with the signature for another type of machine.

For example, it is conceivable that the customer may have an accepted signature limit for 3 different types of machines and be building the statistical model for another two machines that the customer rarely uses.

The next step is to compare the transmitted vector to the existing signature range. If the new transmitted vector (after being compared to the storage signature) is found to be within limits then the transaction is approved and the new transmitted signature is used to update the stored signature which will change very slightly with each new entry. This allows the stored signature to track the aging or change of a customer habits.

If, however, the transmitted signature is found to be out of limits then there is a possibility that the customer is under duress or someone has made an unauthorized use of customer's card and PIN. But, it may also be the case that the customer was merely sloppy in the first attempt. Thus the method then asks the customer to re-enter the PIN. A comparison is then again made. If the comparison is within limits now then the transaction proceeds normally. If the comparison shows that the new transmitted signature is still out of limits then the system immediately initiates a bank emergency procedure. This could involve calling the customer on an intercom system, notifying bank security personnel, or even notifying local law enforcement agencies.

While this emergency procedure is initiated the system may delay the client with innocuous "Transaction in Progress" messages. This is designed to minimize the information given to a possible criminal and to minimize the potential aggravation and provocation to a possibly violent criminal.

What is claimed is:

1. A method of processing automatic teller machine transactions comprising the steps of:

measuring the timing parameters associated with the customer's interactions with the machine transmitting the machine type to an analysis site transmitting the timing parameters to an analysis site comparing those parameters to a stored reference which has an acceptance criterion depending on the type of automatic teller machine and using the results of this comparison to make a decision as to whether or not to handle the transaction in a normal manner or not.

2. The method of claim 1 in which the timing parameters include those of the customer's personal identification number.

3. The method of claim 1 in which the result of a comparison suggestion an abnormal transaction leads to the additional step of asking the customer to reenter at least some of the entered data.

4. The method of claim 1 in which the result of a positive comparison leads to the additional step of updating the stored reference.

5. The method of claim 1 in which the result of at least one comparison suggesting a abnormal transaction leads to the additional step of initiating a bank emergency procedure.

6. The method of claim 1 in which the result of at least one comparison suggesting a abnormal transaction leads to the additional step of calling the customer on an intercom.

7. The method of claim 1 in which the result of at least one comparison suggesting a abnormal transaction leads to the additional step of notifying law enforcement agencies.

8. The method of claim 1 in which the result of at least one comparison suggesting a abnormal transaction leads to the additional step of delaying the customer with messages suggesting that the transaction is progressing.

9. A method of processing electronic transactions comprising the steps of:

measuring the timing parameters associated with the customer's interactions with the customer's keyboard transmitting the keyboard type to an analysis site transmitting the timing parameters to an analysis site comparing those parameters to a stored reference which has an acceptance criterion depending on the type of keyboard and using the results of this comparison to make a decision as to whether or not to handle the transaction in a normal manner or not.

10. The method of claim 9 in which the result of a comparison suggesting a abnormal transaction leads to the additional step of asking the customer to re-enter the personal identification number.

11. The method of claim 9 in which the result of a positive comparison leads to the additional step of updating the stored reference.

12. A method of processing electronic transactions comprising the steps of:

measuring the timing parameters associated with the customer's interactions with an entry machine transmitting the machine type to an analysis site transmitting the timing parameters to an analysis site comparing those parameters to a stored reference which has an acceptance criterion depending on the type of machine and using the results of this comparison to make a decision as to whether or not to handle the transaction in a normal manner or not.

13. The method of claim 12 in which the result of a comparison suggesting a abnormal transaction leads to the additional step of asking the customer to re-enter the personal identification number.

14. The method of claim 12 in which the result of a positive comparison leads to the additional step of updating the stored reference.

* * * * *